United States Patent
Radovanovic et al.

(10) Patent No.: US 7,487,757 B2
(45) Date of Patent: Feb. 10, 2009

(54) ENGINE TUNED FOR HYBRID ELECTRIC AND CONTINUOUSLY VARIABLE TRANSMISSION APPLICATIONS

(75) Inventors: Rod Radovanovic, Columbus, IN (US); John W. Shoemaker, Nashville, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/752,995

(22) Filed: Jan. 7, 2004

(65) Prior Publication Data
US 2005/0145218 A1 Jul. 7, 2005

(51) Int. Cl.
*F02D 31/00* (2006.01)
(52) U.S. Cl. .................. 123/357; 180/65.2; 701/101
(58) Field of Classification Search .......... 123/357, 123/352, 361, 376, 403; 180/65.2, 65.8; 290/1 A, 40 B
See application file for complete search history.

(56) References Cited

U.S. PATENT DOCUMENTS

| | | | | |
|---|---|---|---|---|
| 4,263,997 A * | 4/1981 | Poore | ...................... | 192/103 R |
| 4,306,449 A * | 12/1981 | Hoffman | ...................... | 73/116 |
| 4,600,394 A * | 7/1986 | Dritz | ........................... | 440/38 |
| 4,641,553 A | 2/1987 | Kobayashi | | |
| 5,255,638 A * | 10/1993 | Sasaki et al. | ............ | 123/184.57 |
| 5,357,929 A * | 10/1994 | McCandless | ................ | 123/446 |
| 5,468,196 A | 11/1995 | Minowa et al. | | |
| 5,735,770 A * | 4/1998 | Omote et al. | ................... | 477/5 |
| 5,778,329 A * | 7/1998 | Officer et al. | ................. | 701/55 |
| 5,786,640 A | 7/1998 | Sakai et al. | | |
| 5,862,497 A | 1/1999 | Yano et al. | | |
| 5,984,033 A | 11/1999 | Tamagawa et al. | | |
| 6,090,007 A | 7/2000 | Nakajima et al. | | |
| 6,123,163 A | 9/2000 | Otsu et al. | | |
| 6,161,524 A * | 12/2000 | Akbarian et al. | ............ | 123/478 |
| 6,209,672 B1 | 4/2001 | Severinsky | | |
| 6,248,041 B1 * | 6/2001 | Den Besten | ................. | 477/110 |
| 6,291,903 B1 * | 9/2001 | Horibe | ..................... | 290/40 A |
| 6,301,529 B1 | 10/2001 | Itoyama et al. | | |
| 6,330,498 B2 | 12/2001 | Tamagawa et al. | | |
| 6,338,391 B1 * | 1/2002 | Severinsky et al. | ......... | 180/65.2 |
| 6,367,447 B1 * | 4/2002 | Palansky et al. | ............ | 123/361 |
| 6,554,088 B2 * | 4/2003 | Severinsky et al. | ......... | 180/65.2 |
| 6,601,442 B1 * | 8/2003 | Decker et al. | ............... | 73/117.3 |
| 6,684,863 B2 * | 2/2004 | Dixon et al. | ................. | 123/565 |
| 7,055,486 B2 * | 6/2006 | Hoff et al. | ............... | 123/196 R |

* cited by examiner

*Primary Examiner*—Willis R. Wolfe, Jr.
(74) *Attorney, Agent, or Firm*—Hamre, Schumann, Mueller & Larson, P.C.; J. Bruce Schelkopf (57) ABSTRACT

An engine tuned for use with a hybrid engine or CVT has a relatively narrow torque curve that is roughly centered at the engine's rated speed, with less than 50% of the maximum torque provided throughout 80% of the range of engine speeds. The relatively narrow torque peak permits a variety of optimizations that improve fuel economy and reduce emissions.

12 Claims, 10 Drawing Sheets

Diesel Engine in Conventional Vehicle with a CVT

ENGINE TUNED FOR HYBRID ELECTRIC AND CONTINUOUSLY VARIABLE TRANSMISSION APPLICATIONS

BACKGROUND

Worldwide interest in reducing pollution and improving fuel economy has driven a variety of government regulations demanding ever-improving performance from truck and automobile engines. Automotive companies have achieved past goals for emissions and fuel economy using various technologies such as air-to-air aftercooling, high compression piston ratios, lowering engine mechanical friction, lowering engine pumping losses, advanced exhaust gas recirculation ("EGR") and other such aftertreatment systems, among others. Also, combustion efficiency has been increased by use of high injection pressure fuel systems, fine-tuning of injector nozzle configuration, piston bowl, air motion ("swirl"), and the amount of volume above the rim of the piston producing a "squish." The use of various aftertreatment systems, which remove emissions from engine exhaust before releasing from the vehicle, like Diesel Oxidation Catalyst ("DOC"), has further reduced exhaust pollutants.

A more radical strategy for reducing emissions and improving fuel economy was to replace internal combustion engines with electric motors. Electric motors have a tremendous advantage over combustion engines, especially in city driving, because they can conveniently recapture kinetic energy of the vehicle by connecting the brakes to an electric generator.

In past years, a trickle of electric cars powered by batteries were produced. But because the batteries were heavy and expensive, the cars didn't drive far enough between recharges to satisfy consumers. Even government incentives failed to produce a substantial number of sales of electric vehicles.

A promising solution to the battery problem in electric vehicles is the "hybrid vehicle." Hybrid vehicles employ a hybrid power train, including both a combustion engine and an electric motor. Consequently, gasoline, diesel fuel, or other such fuels can still be used as an efficient means of storing the energy needed to give the vehicle satisfactory operating range, while still realizing many of the advantages of an electric motor, including recapture of braking energy.

Figure 1A:
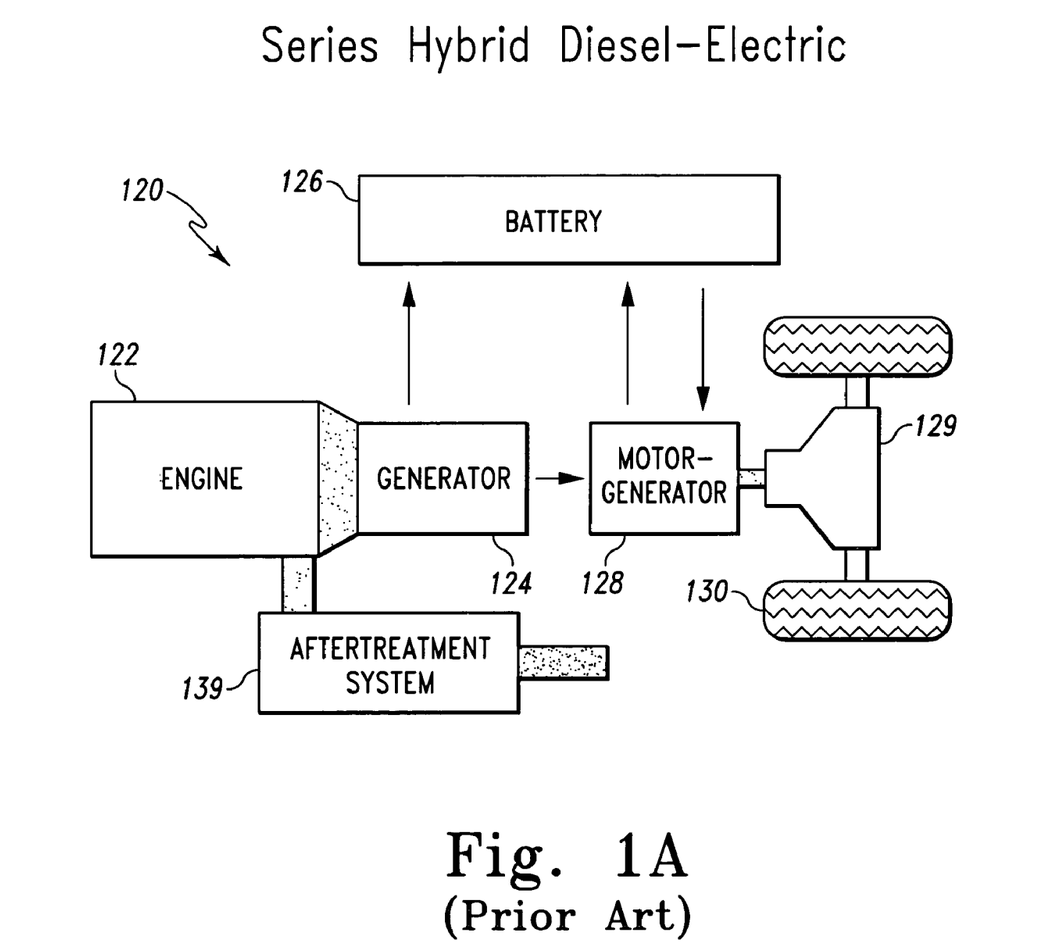
FIG. 1A is a block diagram of a typical series hybrid electric engine.
Figure 1B:
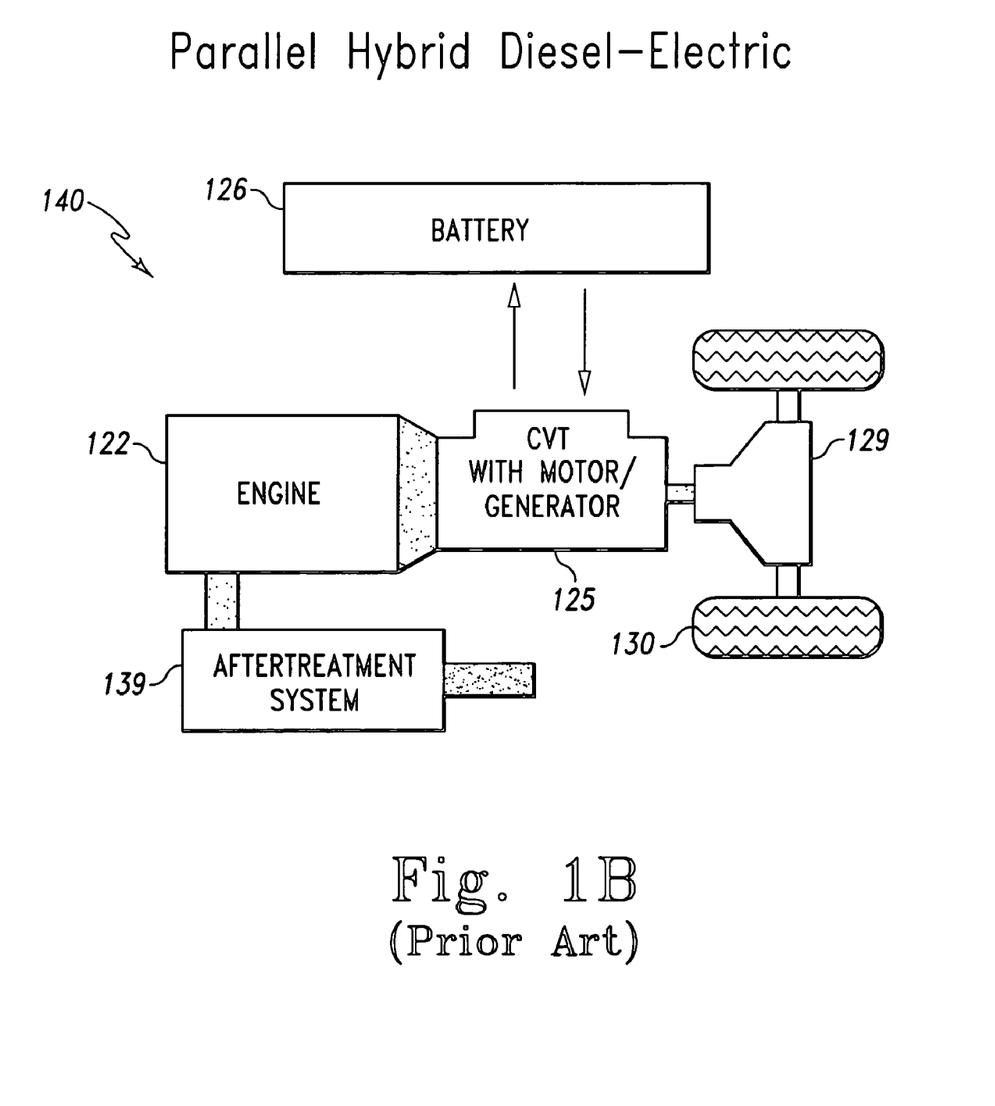
FIG. 1B is a block diagram of a typical parallel hybrid electric engine.

Hybrid vehicles fall generally into one of two general categories: series and parallel hybrids, as shown in FIGS. 1A and 1B. FIG. 1A shows a block diagram for a typical series hybrid, indicated generally at 120. The engine 122 is coupled to a generator 124, and an aftertreatment system 139. The generator 124 supplies power to a motor/generator 128, which, in turn, drives the wheels 130 (possibly through a differential 129). An energy storage system 126, comprising one or more batteries, receives power from the motor/generator 128 during braking, and also directly from the generator 124 as may be required by operating conditions. Power stored in the energy storage system 126 can supplement power from the generator 124 during acceleration.

FIG. 1B shows a block diagram for a typical parallel hybrid, indicated generally at 140. In a parallel hybrid, the engine 122 is connected directly to a continuously variable transmission ("CVT") 125. The CVT 125 comprises a plurality of electric motor/generators, which both add power to the engine power and facilitate operation of the CVT 125. As with the motor/generator 128 in the series hybrid, these motor/generators also recapture braking energy, and return it to the energy storage system 126.

Parallel hybrids have proved to generally more fuel efficient, because they provide for a continuous mechanical connection between the engine and the wheels. (Some energy is always lost when it is converted from mechanical to electrical, or vise versa.)

An important feature of both types of hybrids is that the wheel speed is decoupled from engine RPM. Consequently, the average operating conditions for the combustion engine in a hybrid are quite different from those for a standard vehicle. This contrasts from most conventional vehicles, in which the wheel speed is coupled to the engine speed through a very limited number of gear ratios. Therefore, the overall fuel efficiency and emissions performance of hybrids can be further improved with corresponding optimization of the combustion engine that exploits that decoupling.

Figure 1C:
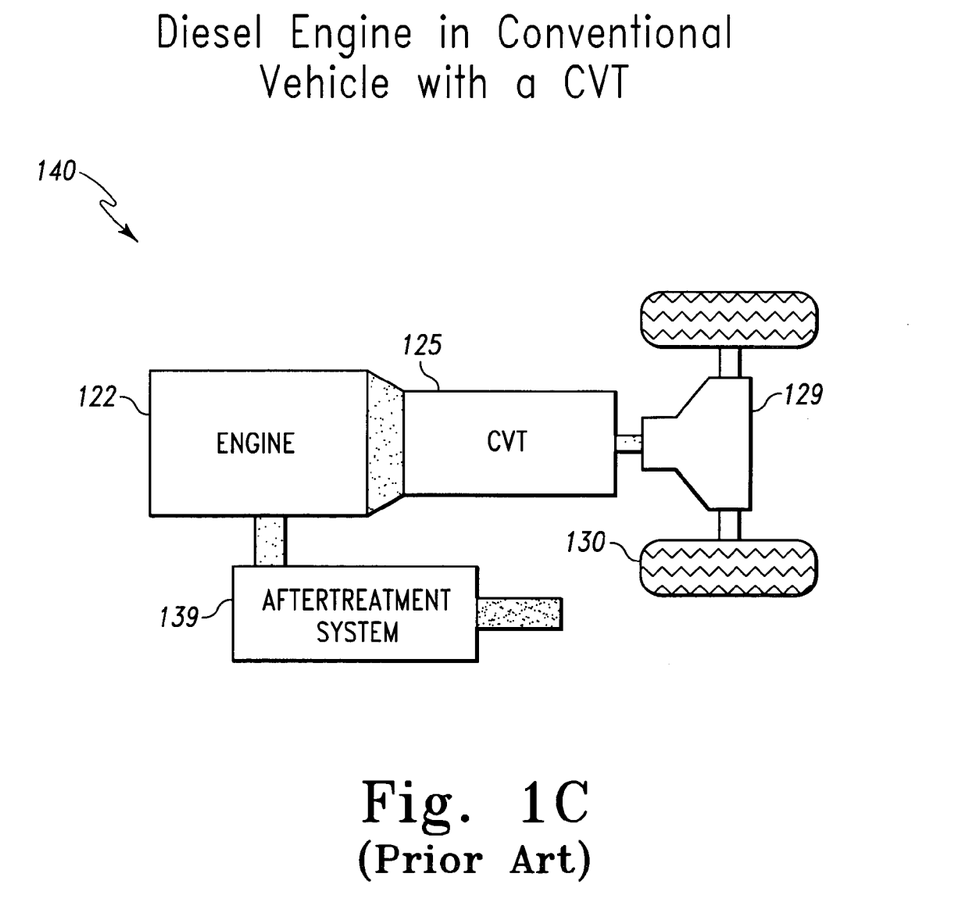
FIG. 1C is a block diagram of a typical standard diesel engine with a CTV.

It will also be appreciated that CVTs can be used on a standard (i.e. non-hybrid) vehicle, as well. Consequently, the engines on such vehicles could likewise be improved using similar optimizations. FIG. 1C is a block diagram of a typical standard diesel engine with a CVT, which components correspondingly numbered as in FIGS. 1A and 1B.

Engine performance curves show engine performance characteristics as a function of the engine's revolutions per minute ("RPM"). The performance curves most frequently analyzed include the output power, torque curve, and brake specific fuel consumption curve. These curves show performance at full throttle, "high idle," (when the operator's foot is pressing the accelerator completely to the floor).

The brake specific fuel consumption curve shows fuel consumption per RPM. Brake specific fuel consumption is typically indicated in units of grams of fuel consumed per BHP per hour (g/(BHP·h)). In general, engine fuel consumption depends greatly on the combustion efficiency and mechanical efficiency. Hybrid vehicles are characterized by excellent fuel consumption because of their ability to recapture braking energy.

The torque curve shows torque as a function of RPM. In general, the less torque changes with RPM, the easier the engine is to handle. The highest torque requires the highest air flow, and thus, in turbocharged engines the intake manifold pressure ("boost") needs to be at the highest levels. (It will be appreciated that almost all modern heavy duty truck and bus engines are turbocharged.) Producing a very high boost at lower RPM, where the maximum torque ("torque peak") occurs in a traditional torque curve is limited by the turbocharger's ability to produce that boost while still having some margin from the "surge" line. At the same time, turbomachinery must have enough capacity for the higher airflow required at higher engine speeds (known as sufficient "swallowing" capacity.) Such demands provide various trade-offs in turbomachinery design which have a significant limiting effect on the engine's maximum power and thermal efficiency.

Figure 2:
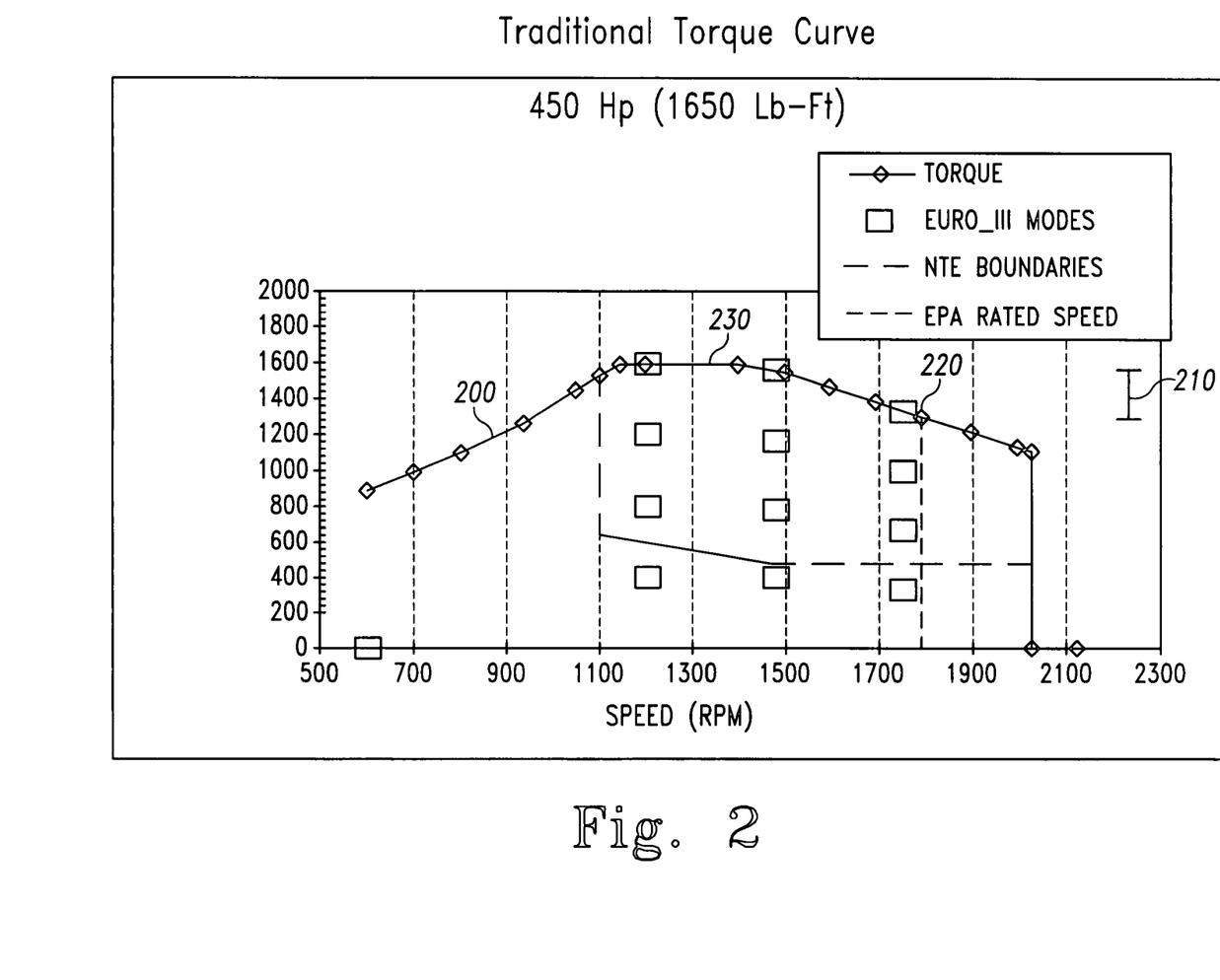
FIG. 2 is a graph of a traditional torque curve having a typical torque rise.

FIG. 2 shows a highly typical torque curve, indicated at 200. The torque curve 200 produces relatively high power at the engine's rated speed 220, but maximum torque occurs at a somewhat lower speed, shown at 230. The difference between the torque at these two points is called the "torque rise," shown at 210. Typically, the ratio between the RPM at 230 and 220 is around 1.3 to 1.4. This torque curve provides good performance over a range of engine speeds, which is important for vehicles having a limited supply of gear ratios.

The relatively wide plateau of this torque curve permits smooth operation throughout a range of vehicle speeds (and through a range of operating conditions, including changes in incline, wind speed, etc.), both permitting the vehicle to accelerate smoothly up through the transmission's gears, and to cruise within a comfortable range of conditions without requiring frequent gear shifting.

In order to accelerate smoothly, the plateau of the torque curve must be broad enough to cover the transmission's "step," that is, the ratio between the gear ratios of adjacent gears. In a typical bus or medium truck (e.g. dump trucks, garbage trucks, etc.) the transmission has 8 to 13 gears, and a step of about 35% to 38%. (Passenger cars typically have 4 to 6 gears, with correspondingly higher step, while tractor trucks typically have substantially more gears, with correspondingly lower step.) Thus, when the truck up-shifts, the engine RPMs must be reduced by about 35% while the truck's speed remains constant as the new gear is engaged. The engine must be able to supply sufficient power at the reduced RPM to accelerate the truck, and continue to supply sufficient power until sufficient RPMs are achieved to permit the step down for the next gear shift.

Similarly, the width of the plateau permits the vehicle to make adjustments in cruising speed required by traffic or other road conditions without having to change gears frequently.

Figure 3:
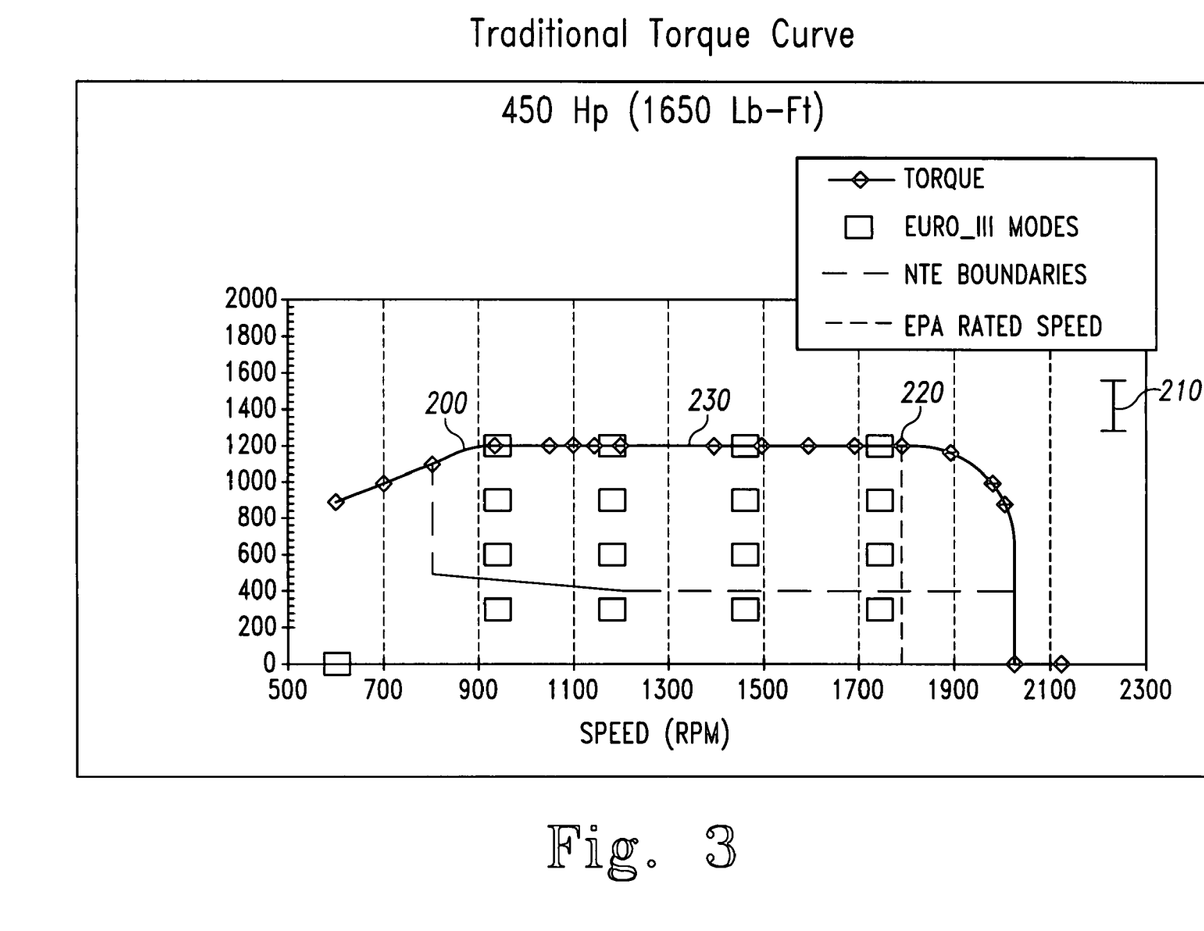
FIG. 3 is a graph of a flat torque curve, characterized by the lack of a torque rise.

FIG. 3 shows a somewhat less common (but not uncommon) torque curve, characterized by the lack of a torque rise. Such a torque curve might be used because of a torque limitation in the transmission system, or for vehicles in which smooth operation throughout a very wide range of RPM is useful (such as dump trucks, cement mixers, etc.).

Likewise, other torque curves are used for other applications, according to the anticipated operating conditions for the vehicle. For example, agricultural tractors typically have torque curves that peak at low RPM. This high torque rise permits them to generate good pulling power from a stop.

Figure 4:
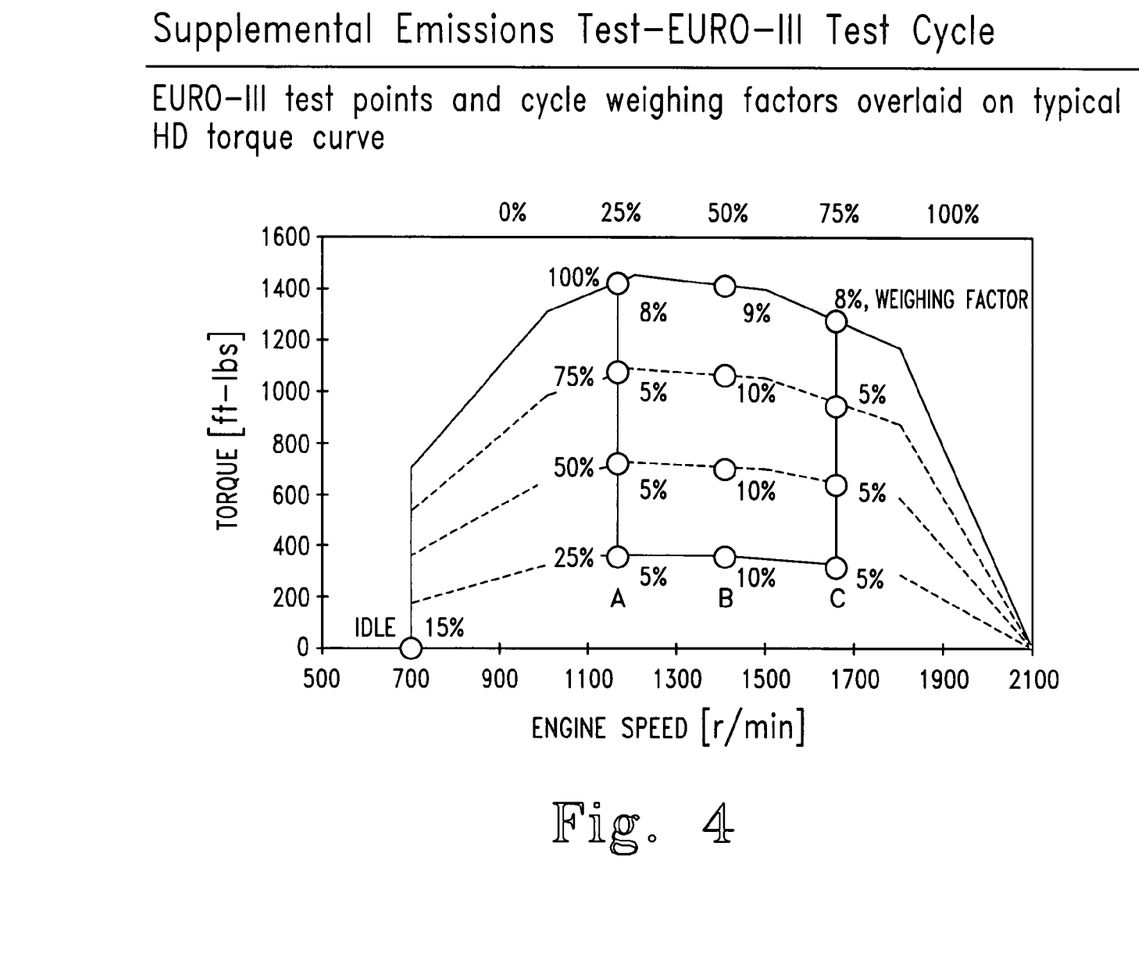
FIG. 4 is a graph illustrating the Euro III Test Cycle.
Figure 5:
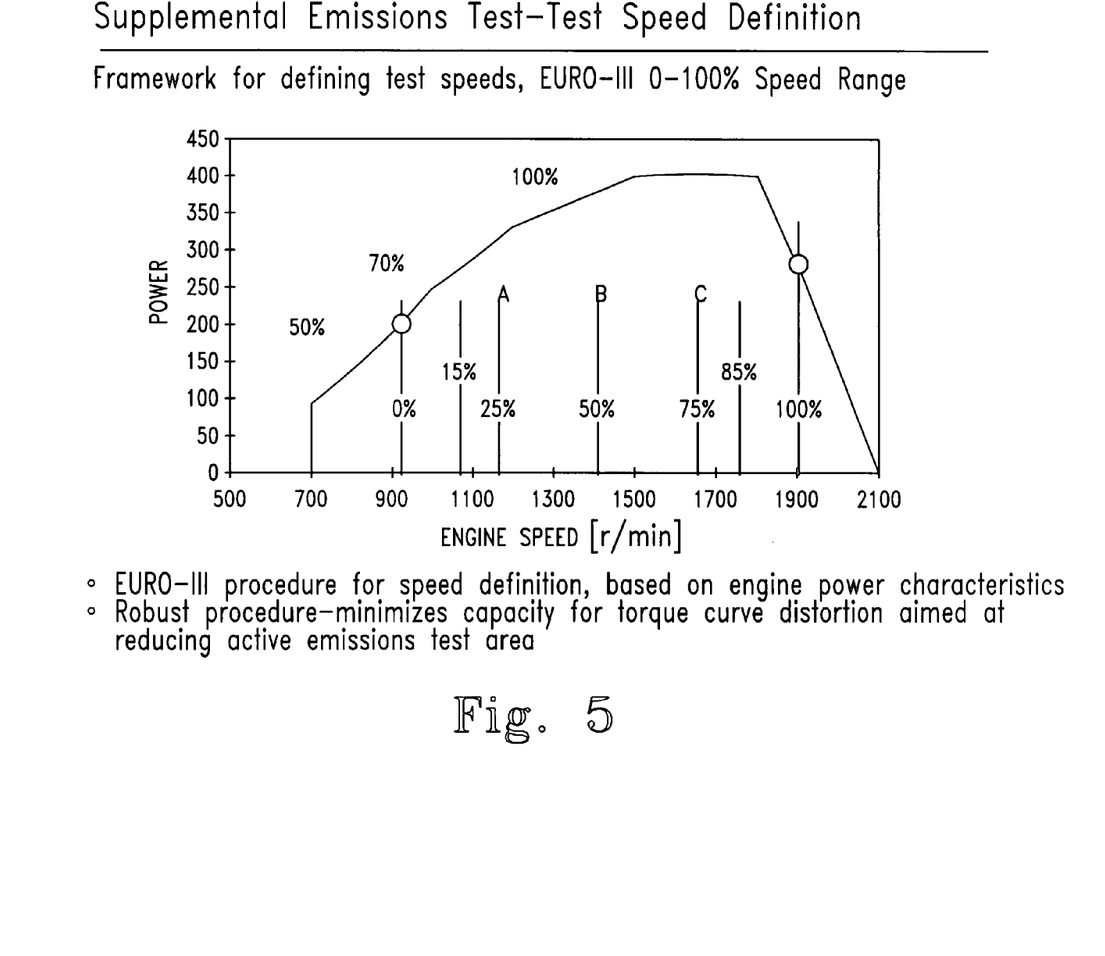
FIG. 5 is a graph illustrating how the engine speeds "A," "B," and "C," used in the Euro III Test Cycle, are defined as a function of the engine's torque curve.

The present set of emissions standards for HD diesel engines, as well as HD natural gas engines and a variety of other diesel-derived engines, measures performance at a variety of operating conditions that are defined by the engine's torque curve. One set of these test conditions, known as the "Euro III Test Cycle," is illustrated in FIG. 4. The engine is operated at steady state at each of the 13 indicated points corresponding to various load levels at three engine speeds, plus idle. As shown in FIG. 4, at each of the three engine speeds, "A," "B," and "C," the engine is operated at load levels that require the maximum torque output at that speed, and at 75%, 50%, and 25% of that maximum torque. FIG. 5 shows how the engine speeds "A," "B," and "C" are defined. As shown in FIG. 5, the maximum power torque output at any speed is determined. The highest engine speed that produces exactly 70% of that maximum is the so-called "100% speed," and the lowest engine speed that produces exactly 50% of that power torque is the so-called "0% speed." Note that, despite their names, these speeds do not correspond to the highest or lowest speeds at which the engine can run, nor to the speeds at which the engine produces 100% or 0% of its maximum power torque. Intermediate speeds are distributed linearly between these two speeds according to engine RPM. Thus, the "A" speed, or 25% speed, is equal to the 0% speed plus 25% of the difference between the 0% speed and the 100% speed. The "B" speed is the 50% speed, and the "C" speed is the 75% speed.

Figure 6:
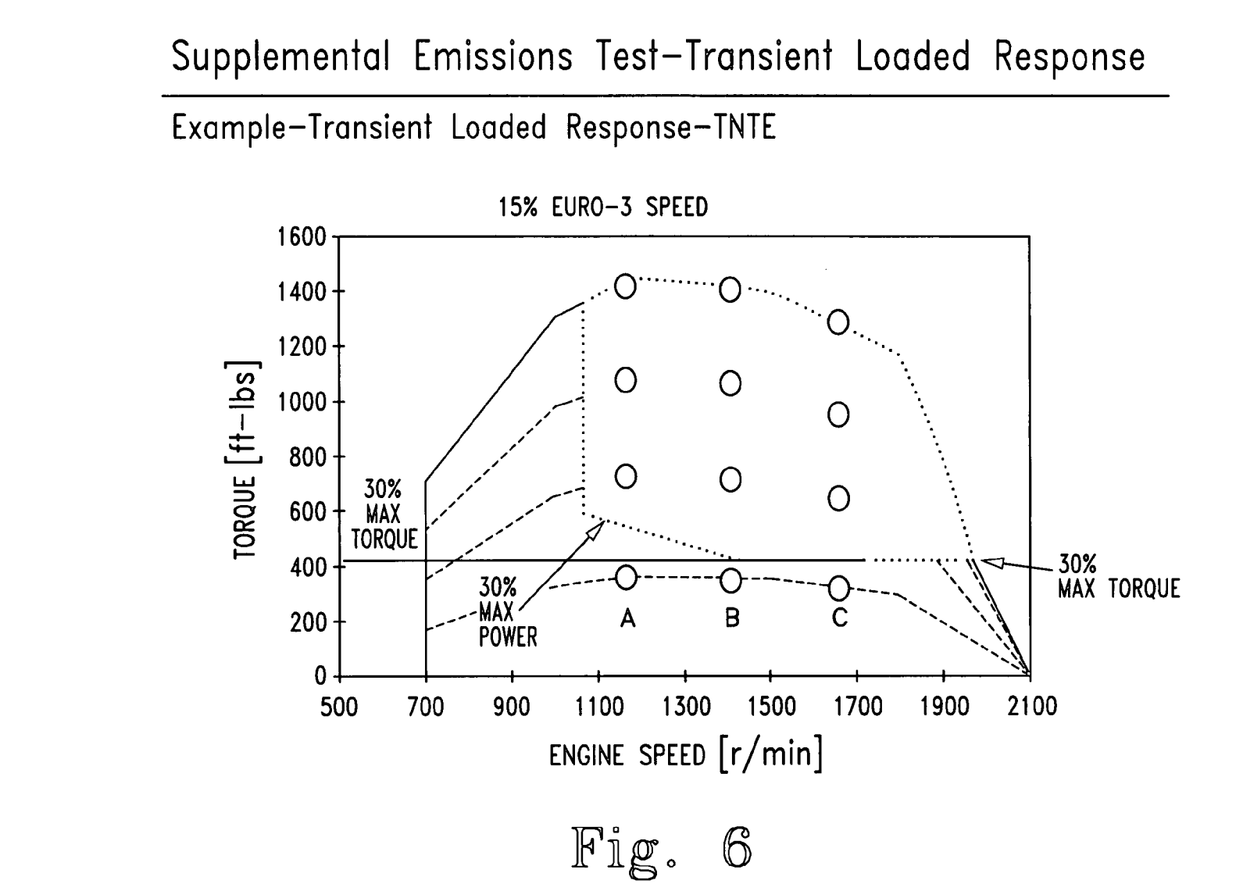
FIG. 6 is a graph illustrating the "Not to Exceed" zone.

FIG. 6 illustrates another aspect of emissions standards today, called the "Not to Exceed" ("NTE") zone. The engine's emissions at every operating condition within the NTE zone must be within the specified limits, and is subject to random testing. The NTE zone is bounded on the left by the so-called 15% speed (as defined by the Euro III Test Cycle, described hereinabove), and on the bottom by the greater of 30% of the maximum torque output at any speed and 30% maximum power, as shown in FIG. 6.

Figure 7:
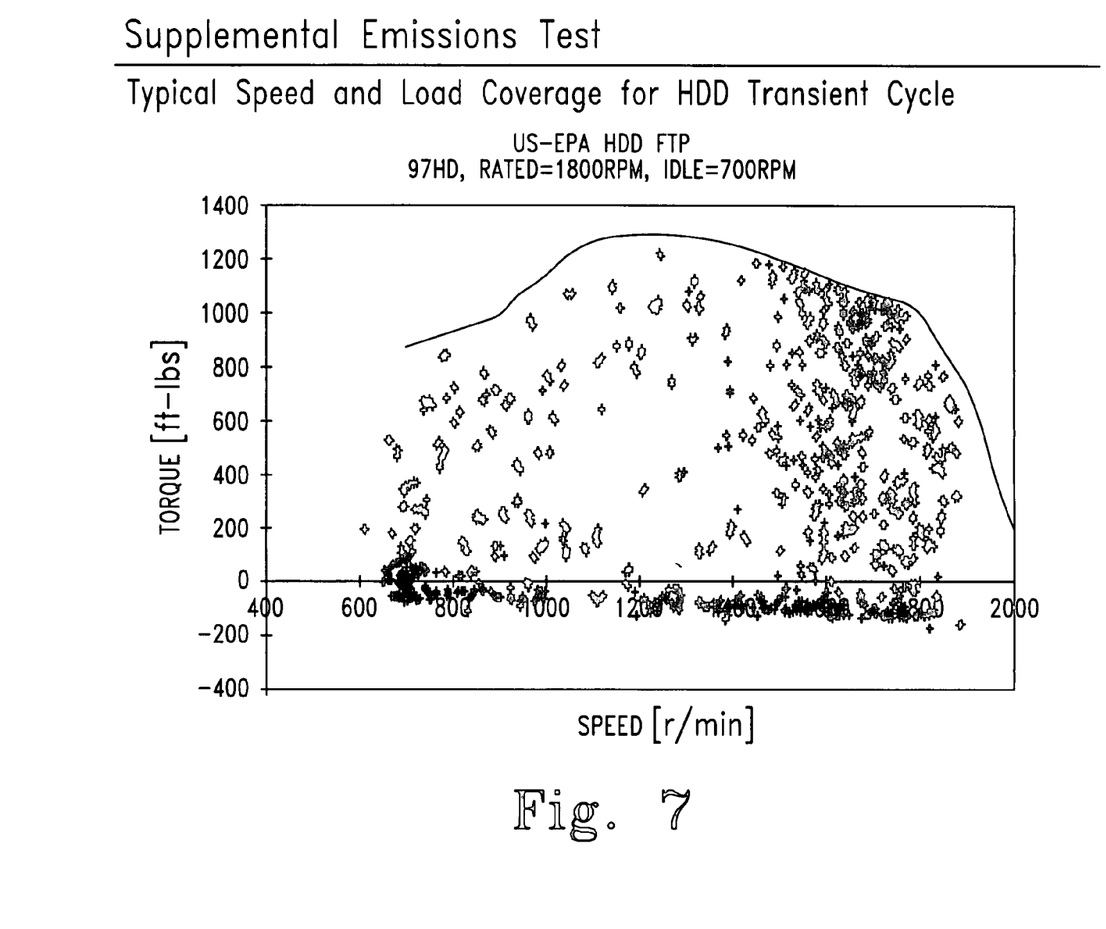
FIG. 7 is a graph illustrating a typical Transient Test Cycle.

FIG. 7 illustrates yet another aspect of emissions standards, called the HD Transient Test Cycle. In this test cycle the engine is run for one second each at 1200 separate conditions selected to immulate typical road conditions. The points illustrated in FIG. 7 are a representative sample of the conditions that might be used in the Transient Test Cycle.

As these test cycles illustrate, prior art engines must meet emissions standards at a wide variety of operating conditions, which requires a substantial amount of design compromise throughout. Thus, in order to meet continuing demand for improved fuel economy and reduced emissions, what is needed is an engine that is tuned specifically for use with a hybrid electric engine. A conventional engine is also need that is tuned for use with a CVT that provides improved fuel efficiency and reduced emissions. The present invention is directed towards these needs, among others.

SUMMARY OF THE INVENTION

A first embodiment engine according to the present invention is tuned to have a torque curve having a torque peak that is approximately centered about the engine's rated speed.

A second embodiment engine according to the present invention is tuned to have a torque curve having a torque peak. The torque peak includes: a first speed at which the engine produces maximum torque; a second speed at which the torque is 70% of the maximum torque; and a third speed at which the torque is 70% of the maximum torque. The third speed is greater than the first and second speeds, and the ratio between the third and second speeds is less than about 1.5.

A third embodiment engine according to the present invention has a torque curve having a torque peak including the maximum torque, wherein the torque drops off by at least 10% within 50 RPM on either side of the maximum torque.

A third embodiment engine according to the present invention has at least one optimized subsystem selected from the set of subsystems consisting of: EGR; water pump; lubrication oil pump; combustion system; and turbocharger. The optimized system is optimized for performance in a range of RPMs that includes the engine's rated speed, and is bounded by RPMs having a ratio between about 0.65 and about 1.5.

BRIEF DESCRIPTION OF THE DRAWINGS

Although the characteristic features of this invention will be particularly pointed out in the claims, the invention itself, and the manner in which it may be made and used, may be better understood by referring to the following descriptions taken in connection with the accompanying figures forming a part hereof.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Alterations and modifications in the illustrated device, and further applications of the principles of the invention as illustrated herein, as would normally occur to one skilled in the art to which the invention relates, are contemplated.

An engine according to the present invention is tuned for use with hybrid electric vehicles, and will permit substantially improved fuel efficiency and reduced emissions. An engine according to the present invention is also suitable for use in a conventional vehicle in conjunction with a CVT, to permit similar improvements.

Figure 8:
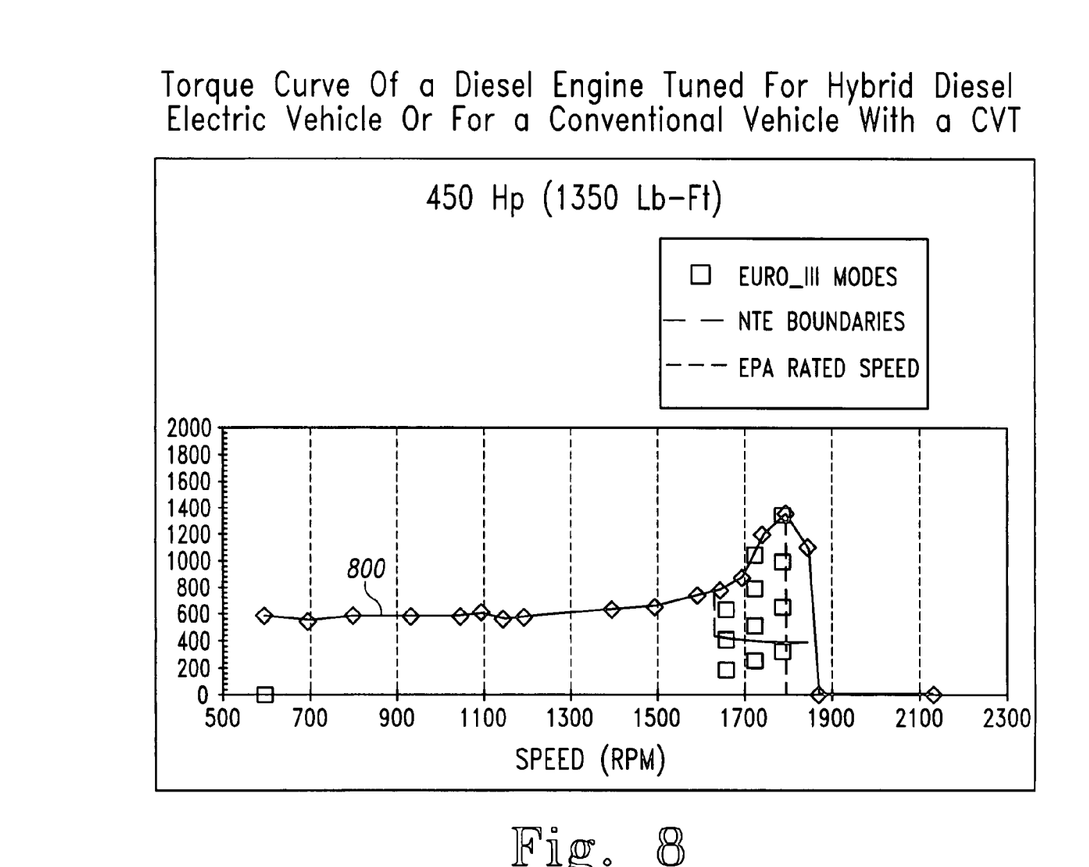
FIG. 8 is a graph of the torque curve of an engine according to the present invention.

FIG. 8 shows a torque curve for a first embodiment engine according to the present invention, indicated generally at 800. The torque curve 800 has a relatively narrow peak torque band, rather than the plateau characteristic of the prior art torque curves 200 and 300. Note also that in the torque curve the relatively narrow torque peak is roughly centered at the engine's rated speed. It has been determined by the present inventors that, because engine speed and wheel speed are decoupled in hybrid engines and conventional engines employing a CVT, it is not necessary to preserve the width of the power plateau in the prior art torque curves. Furthermore, the present inventors have determined that the peak power output can be aligned with the engine's rated speed without harming the vehicle's ability to operate smoothly and easily. The torque curve 800 can be achieved by control of engine fueling as a function of RPM, as is known to those of ordinary skill in the art.

The torque peak in a torque curve according to the present invention is preferably quite narrow. In certain embodiments, "A" and "C" speeds are less than about 300 RPM apart, and preferably less than about 200 RPM apart. For example, as shown in FIG. 8, the "A" and "C" speeds are separated by only about 150 RPM. In certain embodiments, the "A" and "C" speeds may be separated by as little as 100 RPM, or even less, depending upon the transmission. As can be seen in FIGS. 2 and 3, the "A" and "C" speeds in typical prior art torque curves are separated by about 550 RPM.

Tuning the engine to have a torque curve shaped like the one in FIG. 8 permits a variety of improvements to the engine's efficiency.

Those skilled in the art will appreciate that, as discussed hereinabove, engines are optimized in a variety of ways to improve fuel efficiency and reduce emissions. Features that are optimized include such things as piston bowl, swirl, squish, and nozzle geometry, as well as turbocharger design, and EGR design. Even water pump and lubrication oil pump selection is driven, in part, by efficiency concerns.

These optimizations are constrained, however, by the fact that they must be suited for a range of engine operating conditions. For example, water and lubrication oil pumps must be capable of generating sufficient pressure at the lowest anticipated operating RPM. In the typical prior art engine, such as those with the torque curve 200, the maximum thermal loads occur at the peak torque. Thus, the water pump must work hardest while be provided with less than maximum pressure. When operating at higher RPM the excess pressure is simply wasted. In an engine according to the present invention, however, the anticipated operating RPM is more narrow about the engine's rated speed, meaning that smaller water and lubrication oil pumps can be used.

Similarly, the engine combustion system (bowl, swirl, squish, nozzle geometry, etc.) can be better optimized for operation at the narrower band of anticipated RPM, resulting in superior mechanical power output per piston firing while using less fuel. Naturally, such an improvement translates directly into superior fuel economy (and a corresponding reduction in emissions, generally speaking). Furthermore, "over-spray" can be reduced (that is, fuel which burns on the cylinder wall lining), resulting in lower lubrication oil soot loading.

Further reductions in emissions can be achieved by optimization of the EGR system to the narrow RPM band. The torque curve 800 produces higher flow rates and cooler exhaust gas in the exhaust manifold, which permit more efficient operation of the EGR system. The required engine "delta-pressure" (the difference in pressure between the exhaust manifold and the intake manifold) can be achieved more easily, either by turbo matching or by use of a restrictor ring at the exit of the turbocharger engine.

The turbocharger itself can also be optimized, since there is no need for high compressor pressure ratios at low air mass flow. The compressor can have a narrow operating map, and thus have high peak efficiency. (Overall efficiency is the product of compressor efficiency and turbine efficiency.) The compressor can have a narrow operating map, and thus have higher peak efficiencies. The engine's air-to-fuel ratios can be kept higher, thereby reducing thermal loads and particulate emissions.

It will be appreciated that each of these optimizations can be achieved through adjustments to the usual parameters that are familiar to those skilled in the art. Because they continue to be influenced by the specific characteristics of the engine being optimized, these optimizations cannot be defined in terms of specific values. Rather, such optimizations must be determined as is normally done by those skilled in the art, in light of all of the design choices made with respect to a particular engine. Though achieved by known means, such novel optimizations are characterized by the superior performance of the optimized system in a narrow band of engine RPM including the engine's rated speed, typically with a corresponding loss of performance outside of that narrow band.

For the purpose of limiting emissions, preferably, torque drops off from maximum by at least 50% on each side at engine speeds as close to one another as possible. However, it will be appreciated that the extent to which this is possible is a function of how narrow a speed range it is possible for the CVT to maintain. The torque curve 800 is suitable for use with existing CVTs, but synergistic alterations to prior art CVTs are expected to permit even narrower torque peaks. Notwithstanding modifications to the CVT, the width of the torque peak may be limited by losses in efficiency in the electric motor, which might require operation within a range of speeds for optimal efficiency under certain operating conditions.

Note that an engine having the torque curve 800 is actually suited to operate at a range of speeds substantially narrower than those covered by the Euro III Test Cycle. As can be seen in FIG. 8, the "A" speed is well outside the torque peak. As such, although government emissions regulations will require emissions performance while operating at this speed, its performance at that speed will be irrelevant to it's real-world emissions performance. Consequently, existing regulations will actually prevent an engine having the torque curve 800 from realizing all of the potential gains in real-world emissions performance that might otherwise be had.

To some degree, this problem can be mitigated by modifications to the torque curve 800. For example, the torque output at speeds outside the torque peak (the anticipated range of operating speeds) are not directly important to operation of the vehicle, since the engine will not normally be run at these conditions. Thus, the distance between the "A" and "C" speeds could further be narrowed by lowering the torque output on the left side of the torque peak, so that the 0% speed is even higher than that of the torque curve 800. It will be appreciated, however, that smooth and efficient operation of the engine requires that the slope of the torque curve is not too steep, which will limit the degree to which such modifications can efficiently reduce the distance between the "A" and "C" speeds.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An engine having:
   a first speed occurring at 70% of a maximum power on a power curve of the engine;
   a second speed occurring at 50% of the maximum power on the power curve of the engine;
   an A speed equal to the second speed plus 25% of the difference between the first speed and the second speed; and
   a C speed equal to the second speed plus 75% of the difference between the first speed and the second speed;
   wherein A and C are different by less than about 300 RPM.

2. The engine of claim 1, wherein A and C are different by less than about 250 RPM.

3. The engine of claim 2, wherein A and C are different by less than about 150 RPM.

4. The engine of claim 3, wherein A and C are different by less than about 100 RPM.

5. An engine having a torque curve with a first, second, and third speeds, the second speed being 50 RPM less than the first speed, the third speed being 50 RPM more than the first speed, wherein torque is maximum at the first speed, and wherein torque is at least 10% less than maximum at the second and third speeds.

6. The engine of claim 5, wherein torque is at least 20% less than maximum at the second and third speeds.

7. The engine of claim 6, wherein torque is at least 30% less than maximum at the second and third speeds.

8. An engine having at least one optimized subsystem selected from the set of subsystems consisting of:
   EGR;
   water pump;
   lubrication oil pump;
   combustion system; and
   turbocharger;
   wherein a first speed occurs at 70% of a maximum power on a power curve of the engine and a second speed occurs at 50% of the maximum power on the power curve of the engine, an A speed equal to the second speed plus 25% of the difference between the first speed and the second speed; a C speed equal to the second speed plus 75% of the difference between the first speed and the second speed; A and C being different by less than about 300 RPM;
   wherein the optimized subsystem is optimized for performance in a range between A and C.

9. The engine of claim 8, wherein A and C are different by less than about 250 RPM.

10. The engine of claim 9, wherein A and C are different by less than about 200 RPM.

11. The engine of claim 10, wherein A and C are different by less than about 150 RPM.

12. The engine of claim 11, wherein A and C are different by less than about 100 RPM.

* * * * *